(12) United States Patent
Youtz et al.

(10) Patent No.: US 10,778,729 B2
(45) Date of Patent: Sep. 15, 2020

(54) CODEC PARAMETER ADJUSTMENT BASED ON CALL ENDPOINT RF CONDITIONS IN A WIRELESS NETWORK

(71) Applicant: Verizon Patent and Licensing Inc., Arlington, VA (US)

(72) Inventors: Andrew E. Youtz, Princeton, NJ (US); Jun Yuan, Cranbury, NJ (US); Jignesh S. Panchal, Hillsborough, NJ (US); Lily Zhu, Parsippany, NJ (US); Xin Wang, Morris Plains, NJ (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 0 days.

(21) Appl. No.: 15/805,172

(22) Filed: Nov. 7, 2017

(65) Prior Publication Data

US 2019/0141086 A1 May 9, 2019

(51) Int. Cl.
*H04L 29/06* (2006.01)
*H04M 7/00* (2006.01)
*H04W 28/02* (2009.01)
*H04L 1/20* (2006.01)
*H04L 1/00* (2006.01)
*H04W 72/12* (2009.01)

(52) U.S. Cl.
CPC .......... *H04L 65/1069* (2013.01); *H04L 1/007* (2013.01); *H04L 1/0014* (2013.01); *H04L 1/0023* (2013.01); *H04L 1/206* (2013.01); *H04L 65/1006* (2013.01); *H04L 65/1016* (2013.01); *H04L 65/80* (2013.01); *H04M 7/0072* (2013.01); *H04W 28/0236* (2013.01); *H04L 1/0003* (2013.01); *H04L 1/0009* (2013.01); *H04W 72/1236* (2013.01)

(58) Field of Classification Search
CPC . H04L 65/1069; H04L 65/1016; H04L 1/007; H04L 1/206; H04L 65/1006; H04M 7/0072; H04W 28/0236; H04W 72/1236
USPC ......................................................... 370/252
See application file for complete search history.

(56) References Cited

U.S. PATENT DOCUMENTS

| | | | |
|---|---|---|---|
| 2017/0148448 A1* | 5/2017 | Greer | G10L 19/24 |
| 2017/0330576 A1* | 11/2017 | Jung | H04L 29/06 |
| 2017/0337925 A1* | 11/2017 | Greer | G10L 19/24 |
| 2018/0041924 A1* | 2/2018 | Hori | H04W 36/14 |
| 2018/0069653 A1* | 3/2018 | Fujishiro | H04W 16/14 |
| 2018/0176266 A1* | 6/2018 | Filart | H04L 65/1066 |
| 2018/0324235 A1* | 11/2018 | Mufti | H04L 65/1083 |
| 2019/0007464 A1* | 1/2019 | Hori | H04L 65/1069 |
| 2019/0037001 A1* | 1/2019 | Fujishiro | H04W 28/22 |

\* cited by examiner

*Primary Examiner* — Hassan A Phillips
*Assistant Examiner* — Mohammed S Chowdhury

(57) ABSTRACT

A network device determines radio frequency (RF) conditions at a first endpoint and a second endpoint of a call or session. The network device determines optimum first codec parameters for the determined RF conditions at the first endpoint of the call or session, and determines optimum second codec parameters for the determined RF conditions at the second endpoint of the call or session. The network device sends the first codec parameters to the first endpoint for altering operation of a first codec at a first device at the first endpoint. The network device sends the second codec parameters to the second endpoint for altering operation of a second codec at a second device at the second endpoint.

20 Claims, 15 Drawing Sheets

CODEC PARAMETER ADJUSTMENT BASED ON CALL ENDPOINT RF CONDITIONS IN A WIRELESS NETWORK

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enable the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions (e.g., voice sessions) with one or more participants.

A Voice over Long Term Evolution (VoLTE) network is based on the IMS network and provides IP-based voice and data service via a network complying with the LTE standard. VoLTE has more voice and data capacity than many other wireless networks, while using less available bandwidth due to the use of smaller packet headers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In wireless networks, when a call or session is established, an endpoint device usually negotiates a highest codec rate that the device, and the other device at the opposite endpoint of the call or session, can both support. For example, a typical codec rate is 12.65 kilobits per second (kbps) for Adaptive Multi-Rate Wideband (AMR-WB) or 13.2 kbps for Enhanced Voice Services (EVS). However, selection of the highest codec rate does not take into account the radio frequency (RF) conditions in the serving cells of either endpoint device involved in the call or session. Poor RF conditions in the serving cells of either endpoint device may cause RF link reliability problems when the highest codec rate, that both devices can support, is selected.

Additionally, the base station serving each of the endpoint devices is forced to schedule a modulation coding scheme (MCS) and a transport block size (TBS) that is sufficient to deliver the physical layer data rate needed to support the selected highest codec rate. If RF conditions are poor, the base station ideally would use a lower MCS and TBS to provide the most reliable RF link, but at a lower physical layer data rate. However, to support the selected highest codec rate, the base station may not be able to use a MCS and TBS that provides sufficient RF link reliability, resulting in call/session drops or ineffective call/session set-up attempts.

Exemplary embodiments described herein deal with the problem of insufficient RF link reliability, described above, by allowing the wireless network to adjust parameters of the codecs based on the RF conditions existing at both endpoints of the call or session. Exemplary embodiments optimize one or more parameters of the codecs at one endpoint, or both endpoints, of the call or session to improve codec resiliency to errors and to improve RF link reliability. In adverse RF conditions at a cell associated with an endpoint of a call/session, the codec bit rate may, for example, be lowered to a particular rate, or to within a range of rates, to improve the RF link reliability. Additionally, once the codec parameters (e.g., codec bit rate) are adjusted based on the RF conditions at the call/session endpoints, the base stations serving the endpoint devices are notified of the codec parameters and the base stations optimize the MCS and the TBS for those particular adjusted codec parameters.

Figure 1A:
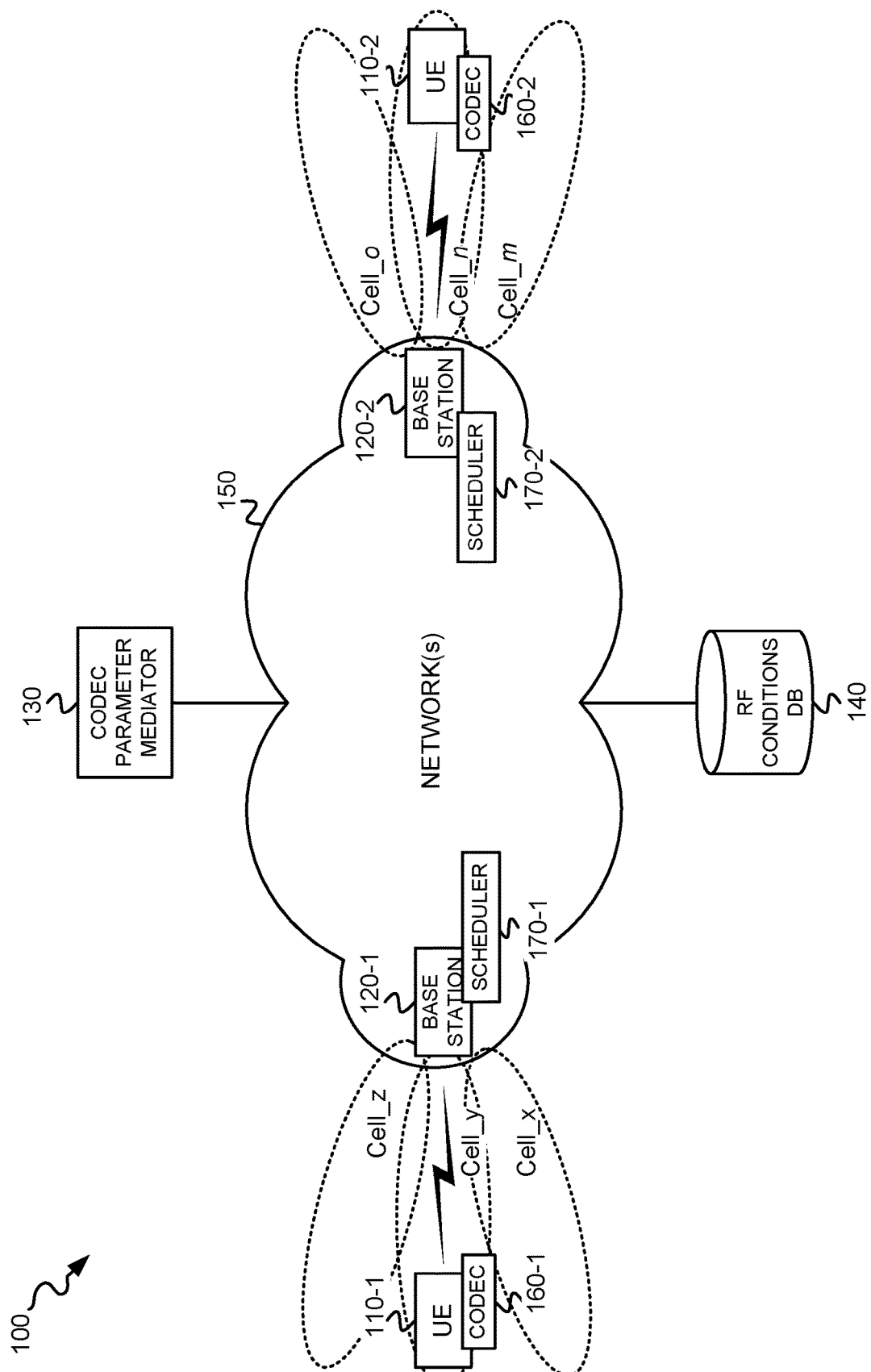
FIG. 1A depicts an exemplary network environment in which calls or sessions are conducted between user equipment devices.

FIG. 1A depicts an exemplary network environment 100 in which calls or sessions are conducted between user equipment (UE) devices. As shown in FIG. 1A, network environment 100 may include UEs 110-1 and 110-2, base stations 120-1 and 120-2, a codec parameter mediator 130, a Radio Frequency (RF) conditions DB 140, and a network(s) 150.

UEs 110-1 and 110-2 may each include any type of wireless device that communicates over network(s) 150 via a call or session. UEs 110-1 and 110-2 may, therefore, communicate with one another, over network(s) 150, by establishing a call or session with one another. UEs 110-1 and 110-2 may each include, for example, a mobile telephone, a personal digital assistant (PDA), a machine-tomachine (M2M) or Internet of Things (IoT) device, or a computer (e.g., laptop, tablet, palmtop or wearable computer). UEs 110-1 and 110-2 may each execute a respective client (not shown) that sends/receives audio, video (e.g., in streaming form), and/or other types of data via a call or session with one another, and may send/receive SIP signaling to/from an IMS network (not shown). A user (not shown) may be associated with each UE 110, where the user may include a permanent or temporary owner, operator, or administrator of the UE 110. UE 110-1 may implement a codec 160-1, and UE 110-2 may implement a codec 160-2, that encodes/decodes audio, video, and/other other data associated with a call/session based on specified codec parameters, such as, for example, a particular selected codec standard of multiple, different codec standards, a particular selected codec bit rate, and/or a particular selected codec mode.

Base stations 120-1 and 120-2 each include, among other components, one or more wireless transceivers and associated antennas (e.g., antenna arrays) for communicating via RF links with UEs 110. Base stations 120 may further include wired transceivers for communicating via one or more wired connections with other components of a wireless network (e.g., a Public Land Mobile Network (PLMN)). Base stations 120 serve as intermediary nodes that receive data from UEs 110 over wireless links, and forward the data via wired links towards their respective destinations, and receive data over wired links and transmit the data to respective destination UEs 110 over RF links. In a Long Term Evolution (LTE) wireless network, base stations 120 may each include, for example, an evolved NodeB (eNodeB). Base station 120-1 includes a scheduler 170-1, and base station 120-2 includes a scheduler 170-2, that each performs radio resource management functions, such as scheduling algorithms, for transmitting data. Scheduler 170-1 of base station 120-1 may, among other functions, schedule and transmit data on a downlink to UE 110-1. To transmit the data, scheduler 170-1 may select a particular MCS and a particular TBS that is sufficient to deliver a physical layer data rate that is needed to support a particular selected codec rate at UE 110-1. Additionally, scheduler 170-2 of base station 120-2 may, among other functions, schedule and transmit data on a downlink to UE 110-2. To transmit the data, scheduler 170-2 may select a particular MCS and a particular TBS that is sufficient to deliver a physical layer data rate that is needed to support a particular selected codec rate at UE 110-2.

Codec parameter mediator 130 includes one or more network devices that operate to adjust codec parameters associated with calls or sessions between UEs 110-1 and 110-2 based on RF conditions present at the call/session endpoints, as described in further detail below. In one implementation, the one or more network devices include one or more devices that implement the functionality for the codec parameter mediator 130 (e.g., via software or hardware). In another implementation, codec parameter mediator 130 may be implemented at at least one of the UEs 110 involved in a particular call/session (e.g., an app installed at one or both call/session endpoints that implements codec parameter mediator 130 functionality). In this implementation, either a single UE 110 at one endpoint of a call/session may execute the functionality of the codec parameter mediator 130, or both UEs 110 at each endpoint of the call/session may execute the codec parameter mediator 130, with both codec parameter mediators 130 cooperating to mediate the codec parameters based on endpoint RF conditions. In other implementations, such as described below with respect to FIGS. 2B-2B, the functionality of the codec parameter mediator 130 may be implemented within one or more nodes of a signaling network (e.g., an IMS network) involved in setting up, maintaining, and/or taking down a call/session between UEs 110. The one or more "network devices" that implement the functionality of codec parameter mediator 130 may, therefore, be one or more UEs 110 involved in a call/session, one or more devices connected to network(s) 150, or one or more devices connected to a signaling network (not shown in FIG. 1A) involved in the call/session. RF conditions DB 140 includes one or more network devices that store, in a data structure, data detailing RF conditions present at locations within a wireless network. For example, the data may include information detailing RF conditions present at multiple cells of one or more PLMNs.

Network(s) 150 may include one or more networks of various types including, for example, a telecommunications network (e.g., Public Switched Telephone Networks (PSTNs)), one or more wireless networks (e.g., a PLMN(s), a satellite network(s)), the Internet, a wired and/or wireless local area network (LAN), a wired and/or wireless wide area network (WAN), a metropolitan area network (MAN), an intranet, or a cable network (e.g., an optical cable network). In one exemplary implementation, as described further below with respect to FIGS. 2A-2D, network(s) 150 may include a VoLTE network for call/session transport and an IMS network for call/session signaling. The VoLTE network may implement packet-switched telephony. The packet-switched telephony may include Internet Protocol (IP)-based telephony. The IMS network may use SIP for voice and multimedia session control, such as for creating, modifying and terminating sessions between devices (e.g. between UEs 110-1 and 110-2).

The configuration of network components of network environment 100 is shown in FIG. 1A is for illustrative purposes. Other configurations may be implemented. Therefore, network environment 100 may include additional, fewer and/or different components that may be configured in a different arrangement than that depicted in FIG. 1A. For example, though network environment is depicted as including two UEs 110 and two base stations 120, network environment 100 may include numerous UEs (i.e., more than two) and numerous base stations.

Figure 1B:
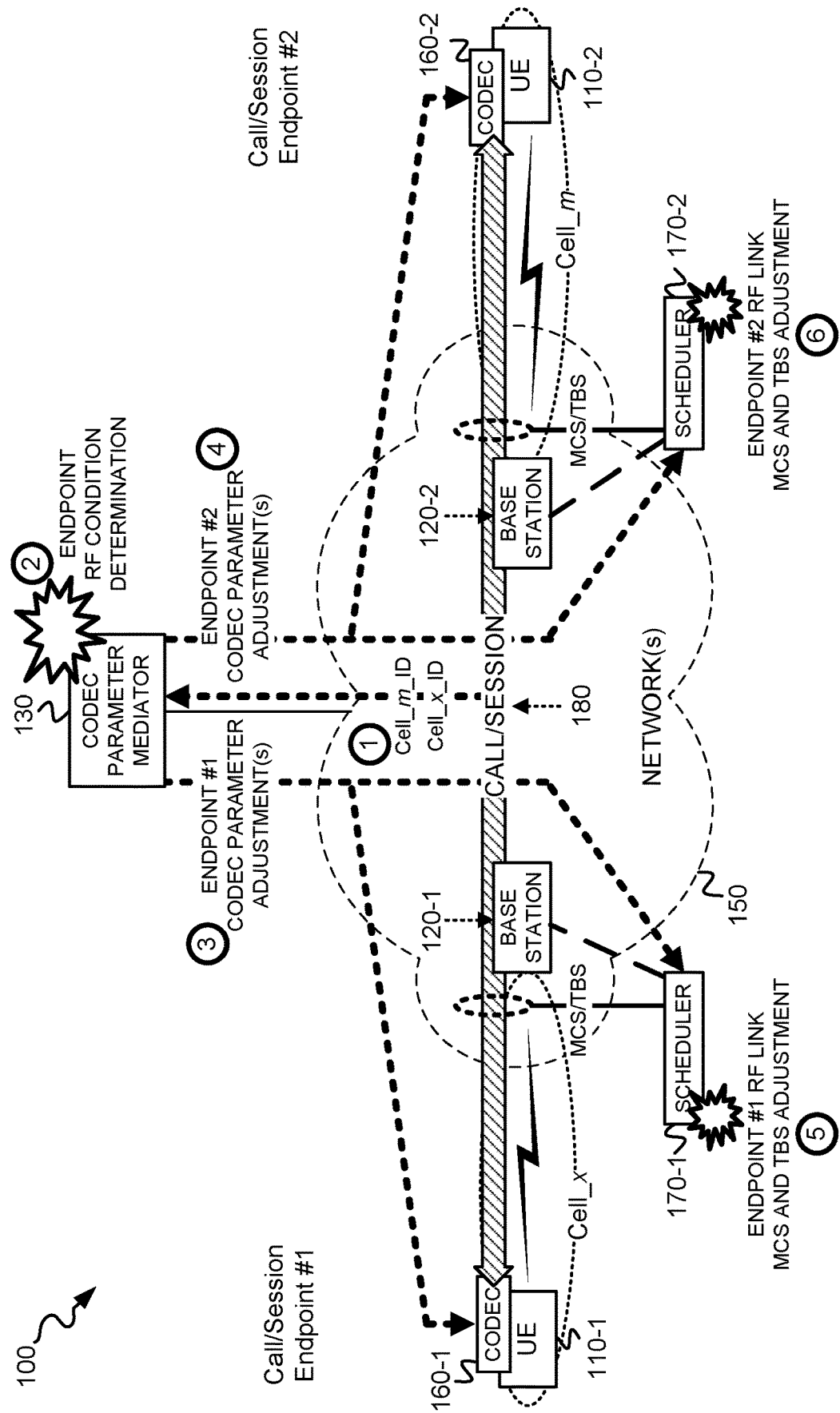
FIG. 1B depicts an exemplary overview of call/session endpoint codec parameter adjustment based on call/session endpoint RF conditions within the network environment of FIG. 1A.

FIG. 1B depicts an exemplary overview of call/session endpoint codec parameter adjustment based on call/session endpoint RF conditions within the network environment 100 of FIG. 1A. In the overview of FIG. 1B, the wireless network(s) serving UEs 110-1 and 110-2 includes a PLMN (i.e., a cellular network) where a respective network cell, and its associated base station 120, serves each UE 110. As shown, a call or session 180 is established, between UEs 110-1 and 110-1, and codec 160-1 at UE 110-1 and codec 160-2 at UE 110-2 are employed to code and decode the audio, video, and/or other types of data being communicated between the UEs 110-1 and 110-2 during the call or session. Codecs 160-1 and 160-2 may use any type of codec standard including, for example, the Adaptive Multi-Rate (AMR), AMR-Wideband (AMR-WB), Enhanced Voice Services (EVS), or BroadVoice codec standards. Each UE 110 may, in some implementations, support multiple different codecs, and may negotiate with one another, or via codec parameter mediator 130, to determine which of the multiple different codecs is to be used for a given call or session.

The codec parameter adjustment process, shown in overview in FIG. 1B, may be performed upon the initiation of a call or session, or may be performed during an ongoing call or session. When performed during an ongoing call or session, the codec parameter adjustment process may be performed periodically (e.g., at timed intervals during the call/session) or may be performed upon the occurrence of a specified event(s) (e.g., upon noted changes in RF conditions at either call/session endpoint).

As shown in FIG. 1B, codec parameter mediator 130 identifies (shown with a "1" within a circle) the particular cells (e.g., cell_x and cell_m) serving the locations of the UEs 110-1 and 110-2 at the call/session endpoints. Cell_x, established by base station 120-1, currently serves UE 110-1, and cell_m, established by base station 120-2, currently serves UE 110-2. Codec parameter mediator 130 may identify the cells of the call/session endpoints by, for example, extracting serving cell identifying information from signaling associated with setting up the call/session between UE 110-1 and 110-2.

Upon identification of the cells serving the call/session endpoints, codec parameter mediator 130 performs an endpoint RF condition determination (shown with a "2" within a circle). The endpoint RF condition determination may include performing a lookup into RF conditions DB 140 (not shown in FIG. 1A), based on the cell identifiers, to retrieve data that details the current RF conditions at the cells of the call/session endpoints. Codec parameter mediator 130 may, based on the determined RF conditions at the cells of the call/session endpoints, optimize the codec parameters for codecs 160-1 and/or 160-2 to enhance RF link reliability and/or RF quality/quality of service (QoS) at call/session endpoint #1 UE 110-1 and/or call/session endpoint #2 UE 110-2. Codec parameter mediator 130 sends the endpoint #1 codec parameter adjustment(s) (shown with a "3" within a circle) to codec 160-1 at UE 110-1 and to scheduler 170-1 of base station 120-1. In an implementation in which codec 160 employs the EVS codec standard, codec parameter mediator 130 may change the value of the "ch-aw-recv" parameter, of the Session Description Protocol (SDP), to a new channel-aware mode for receive direction redundancy, or may change the value of a "br" parameter to a new codec bit rate, where both the channel-aware mode and the changed "br" parameter improve the RF link reliability. Codec parameter mediator 130 further sends the endpoint #2 codec parameter adjustment(s) (shown with a "4" within a circle) to codec 160-2 at UE 110-2 and to scheduler 170-2 of base station 120-2. Though not shown in FIG. 1B, codec 160-1 subsequently alters the operation of codec 160-1, for the particular call/session between the call/session endpoints, based on the endpoint #1 codec parameter adjustment(s), and codec 160-2 also subsequently alters the operation of codec 160-2, for the call/session between the call/session endpoints, based on the endpoint #2 codec parameter adjustment(s).

Upon receipt of the endpoint #1 codec parameter adjustment(s) at scheduler 170-1 of base station 120-1, scheduler 170-1 adjusts the MCS and TBS (shown with a "5" within a circle), for use on the uplink and/or downlink between base station 120-1 and UE 110-1, based on the endpoint #1 codec parameter adjustment(s). Additionally, upon receipt of the endpoint #2 codec parameter adjustment(s) at scheduler 170-2 of base station 120-2, scheduler 170-2 adjusts the MCS and TBS (shown with a "6" within a circle), for use on the uplink and/or downlink between base station 120-2 and UE 110-2, based on the endpoint #2 codec parameter adjustment(s).

Figure 2A:
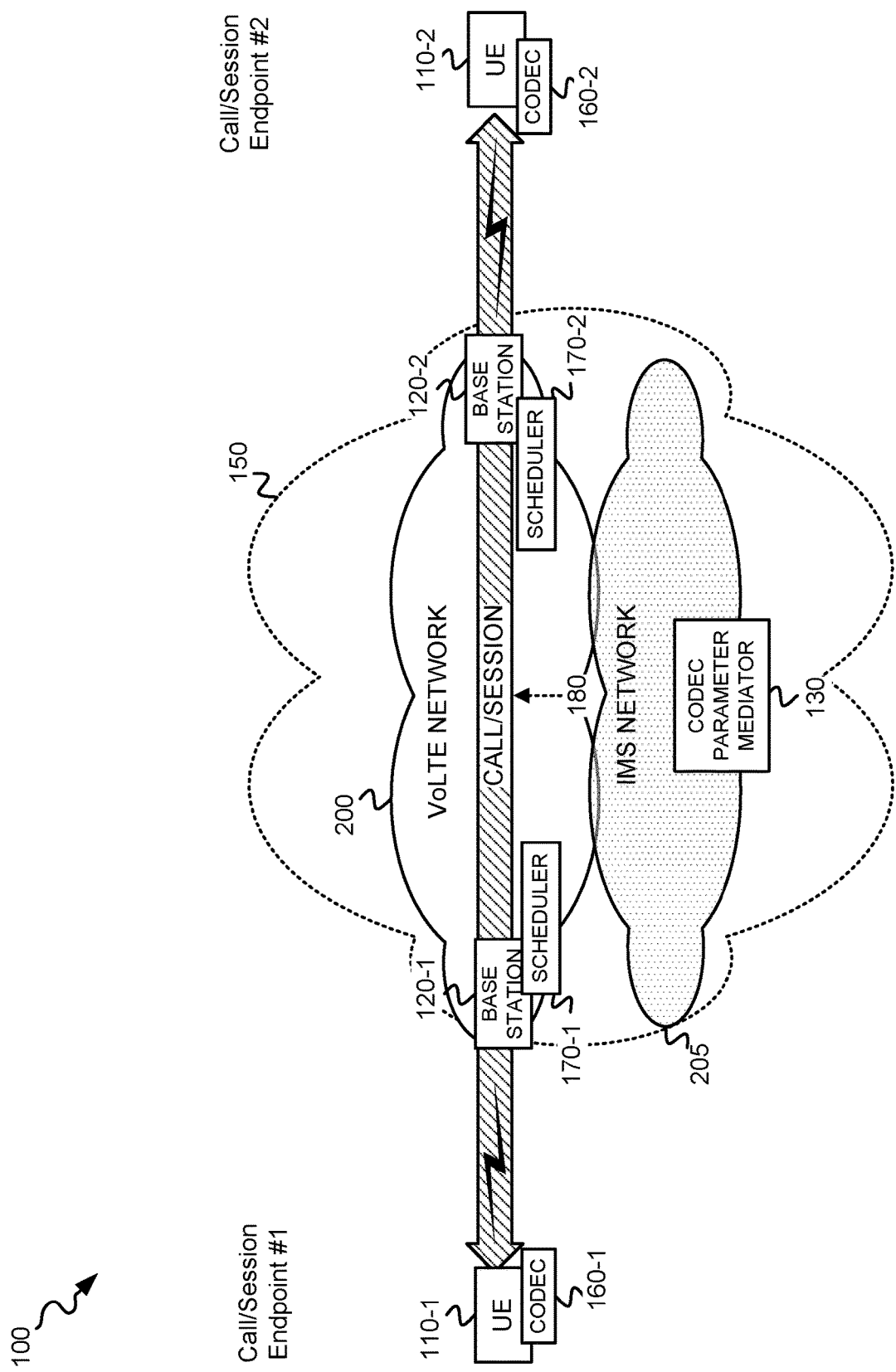
FIG. 2A depicts the exemplary network environment of FIG. 1A in an implementation in which the networks include a Voice over Long Term Evolution transport network and an Internet Protocol Multimedia Subsystem signaling network.

FIG. 2A depicts the exemplary network environment 100 of FIG. 1A in an implementation in which network(s) 150 includes a VoLTE network 200 for transporting a call or session between UEs 110 and an IMS network 205 for signaling associated with set-up, conduct, and completion of the call/session transported over VoLTE network 200. As shown, network environment 100 includes UE 110-1, at a first call/session endpoint, connected to base station 120-1 of VoLTE network 200 and UE 110-2, at a second call/session endpoint, connected to base station 120-2 of VoLTE network 200. IMS network 205 may include one or more connections (not shown) to VoLTE network 200. Signaling (not shown) over IMS network 205 may establish a call or session 180 between UE 110-1 and 110-2 via base stations 120-1 and 120-2. Codec parameter mediator 130 may be a component of IMS network 205, or may connect to IMS network 205 either directly or indirectly via another component or network of network(s) 150.

Figure 2B:
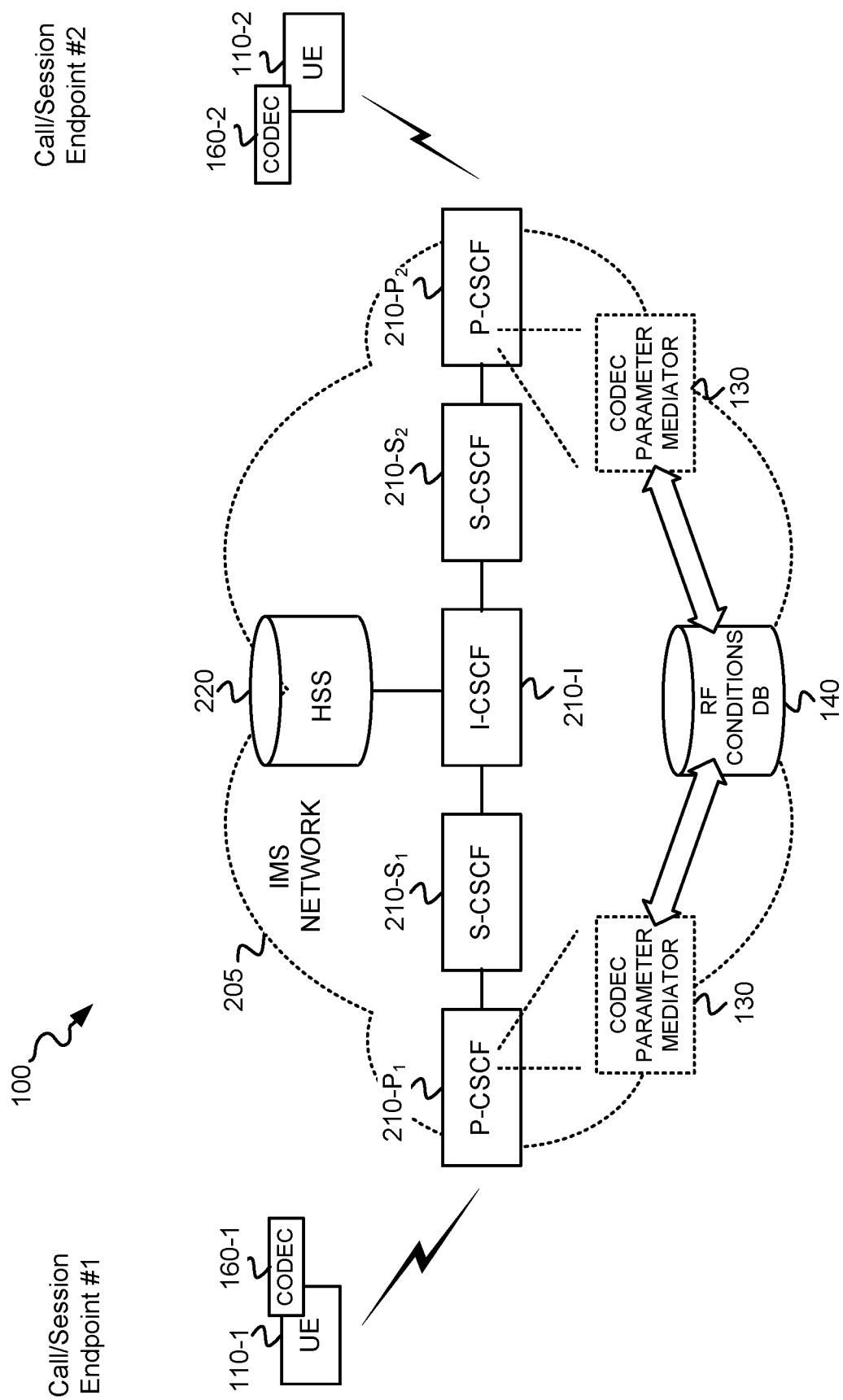
FIG. 2B depicts a portion of the network environment of FIG. 2A, including exemplary components of the Internet Protocol Multimedia Subsystem network.

FIG. 2B depicts a portion of the network environment 100 of FIG. 2A, including exemplary components of IMS network 205. As shown, IMS network 205 may include a Proxy Call Session Control Function (P-CSCF) 210-$P_1$, a serving Call Session Control Function (S-CSCF) 210-$S_1$, an Interrogating Call Session Control Function I-CSCF 210-I, a S-CSCF 210-$S_2$, a P-CSCF 210-$P_2$, a Home Subscriber Server (HSS) 220, and RF conditions DB 140. P-CSCF S-CSCF 210-$S_1$, I-CSCF 210-I, S-CSCF 210-$S_2$, and P-CSCF 210-$P_2$ may be generically and individually referred to herein as "CSCF 210".

P-CSCF 210-$P_1$ acts as an edge of IMS network 205 through which UE 110-1 obtains access. P-CSCF 210-$P_1$ maintains an awareness of all IMS endpoints that are currently registered with IMS network 205, and performs various manipulations of SIP signaling messages that are arriving from, or being sent to, the IMS endpoints (e.g, UEs 110-1 and 110-2). P-CSCF 210-$P_1$ maintains a connection with S-CSCF 210-$S_1$.

S-CSCF 210-$S_1$ processes all originating and terminating SIP requests and responses associated with endpoints registered with S-CSCF 210-$S_1$ (including UE 110-1). S-CSCF 210-$S_1$ routes the SIP signaling towards its destination (e.g., towards P-CSCF 210-$P_1$ and UE 110-1), or towards UE 110-2 via I-CSCF 210-I. I-CSCF 210-I passes SIP signaling to/from S-CSCF 210-$S_1$ and S-CSCF 210-$S_2$. I-CSCF 210-I queries HSS 220 to learn the identity of the S-CSCF assigned to a given UE 110 so that it can properly forward the SIP signaling. HSS 220 includes a master user database that supports all of CSCFs 210 of IMS network 205. The master user database of HSS 220 stores user subscription-related information (e.g., subscriber profiles), and performs authentication and authorization of the user. The subscriber profiles stored in the database of HS 220 may include an indication of whether a given user has subscribed to usage of VoLTE network 200 of FIG. 2A.

S-CSCF 210-$S_2$ processes all originating and terminating SIP requests and responses associated with endpoints registered with S-CSCF 210-$S_2$ (including UE 110-2). S-CSCF 210-$S_2$ routes the SIP signaling towards its destination (e.g., towards P-CSCF 210-$P_2$ and UE 110-2), or towards UE 110-1 via I-CSCF 210-I. P-CSCF 210-$P_2$ acts as an edge of IMS network 205 through which UE 110-2 obtains access. P-CSCF 210-$P_2$ also maintains an awareness of all IMS endpoints that are currently registered with IMS network 205, and performs various manipulations of SIP signaling messages that are arriving from, or being sent to, the IMS endpoints (e.g., UEs 110-1 and 110-2). P-CSCF 210-$P_2$ maintains a connection with S-CSCF 210-$S_2$.

P-CSCF 210-$P_1$, S-CSCF 210-$S_1$, I-CSCF 210-I, S-CSCF 210-$S_2$, and P-CSCF 210-$P_2$ may each include functionality implemented in multiple, different network devices, or in a same, single network device. The configuration of the network components of the portion of the network environment 100, shown in FIG. 2B, is for illustrative purposes. Other configurations may be implemented. Therefore, the portion may include additional, fewer and/or different components that may be configured in a different arrangement than that depicted in FIG. 2B.

Figure 2C:
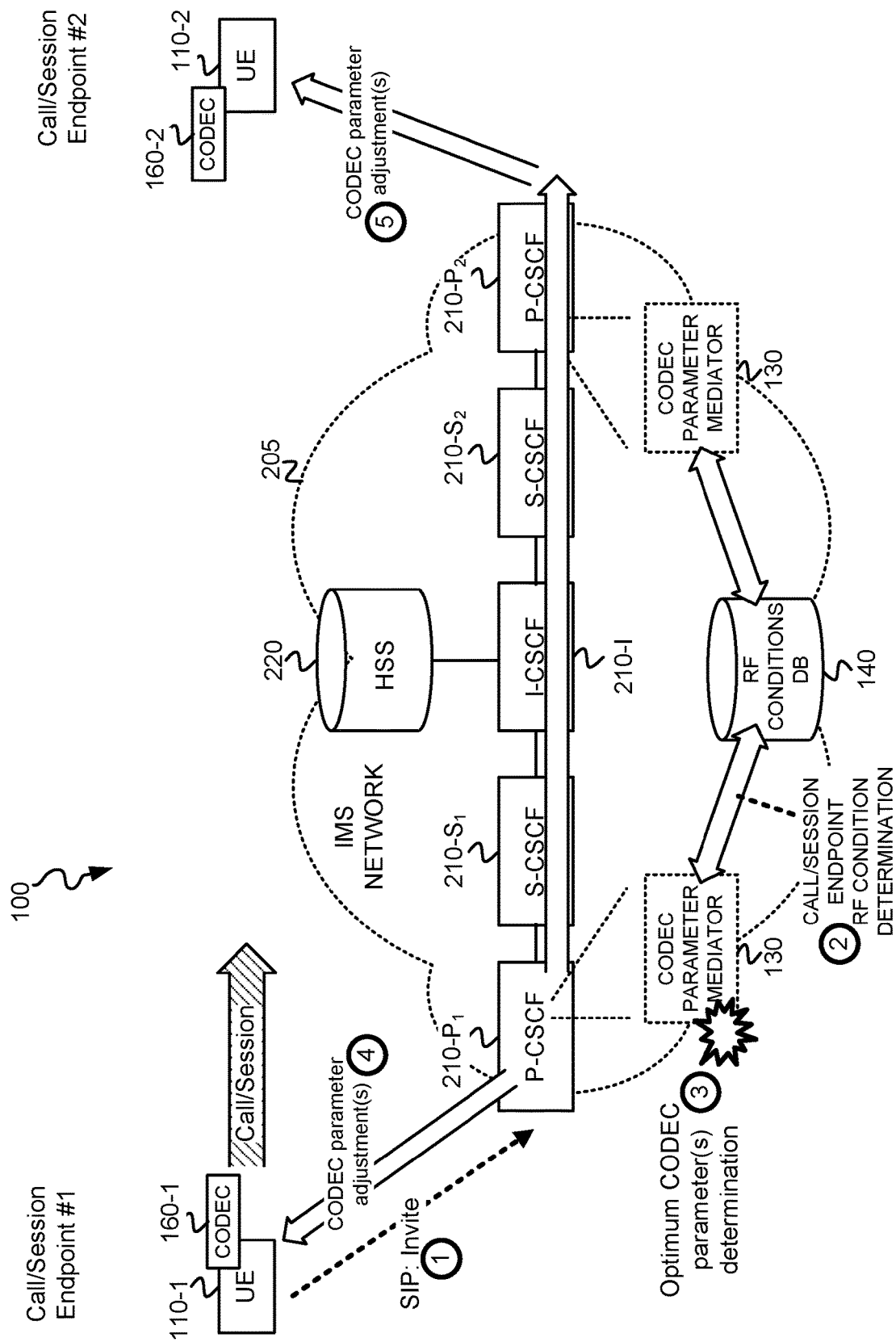
FIG. 2C depicts an overview of call/session endpoint codec parameter adjustment during call/session set-up between user equipment.

FIG. 2C depicts an overview of call/session endpoint codec parameter adjustment in the exemplary implementation in which VoLTE network 200 is used for establishing the call/session and IMS network 205 is used for signaling associated with the call/session, and in circumstances where the call/session is in the process of being set-up between UE 110-1 and UE 110-2. At the initiation of the call/session from UE 110-1, a SIP Invite message (shown with a "1" within a circle) is sent from UE 110-1 to P-CSCF 210-$P_1$. In this implementation, P-CSCF 210-$P_1$ includes the functionality for acting as codec parameter mediator 130 and, therefore, intercepts the SIP Invite message and performs a lookup into RF conditions DB 140 to retrieve RF conditions data that permits a determination of call/session endpoint RF conditions (shown with a "2" within a circle). For example, P-CSCF 210-$P_1$ may extract cell identifiers from the SIP invite message, or from other signaling, to identify each of the cells that are serving UEs 110-1 and 110-2. P-CSCF 210-$P_1$ may use the extracted cell identifiers for performing the lookup into RF conditions DB 140 to determine what RF conditions are currently present at the cells serving UEs 110-1 and 110-2.

Based on the determined RF conditions at each of the cells serving UEs 110-1 and 110-2, P-CSCF 210-$P_1$ determines optimum codec parameters (shown as a "3" within a circle) for the call/session between UEs 110-1 and 110-2. The optimum codec parameter determination may include determining optimum codec parameters for the codec 160-1 at call/session endpoint #1 and/or determining optimum codec parameters for the codec 160-2 at call/session endpoint #2. In an implementation in which P-CSCF 210-$P_1$ simultaneously optimizes the codec parameters for both codecs 160 at both call/session endpoints, P-CSCF 210-$P_1$ may balance the codec parameters between codec 160-1 at call/session endpoint #1 and codec 160-2 at call/session endpoint #2 to optimize certain aspects of call/session quality or quality of service (Qos) between UEs 110-1 and 110-2.

As shown in FIG. 2C, during call set-up and based on the optimum codec parameter determination, P-CSCF 210-$P_1$ sends the determined first codec parameter adjustment(s) to codec 160-1 at UE 110-1 (shown with a "4" within a circle), and/or sends the second determined codec parameter adjustment(s) to codec 160-2 at UE 110-2 (shown with a "5" within a circle) via S-CSCF 210-$S_1$, I-CSCF 210-I, S-CSCF 210-$S_2$, and P-CSCF 210-$P_2$. Codec 160-1 at UE 110-1, and codec 160-2 at UE 110-2, adjust codec operation associated with encoding/decoding data of the call/session based on the received codec parameter adjustments. In an implementation in which codec 160 employs the EVS codec standard, codec parameter mediator 130 may change the value of the "ch-aw-recv" parameter, in the SDP, to a new channel-aware mode for receive direction redundancy, or may change the value of a "br" parameter to a new codec bit rate, where both the channel-aware mode and the changed "br" parameter improve the RF link reliability.

Figure 2D:
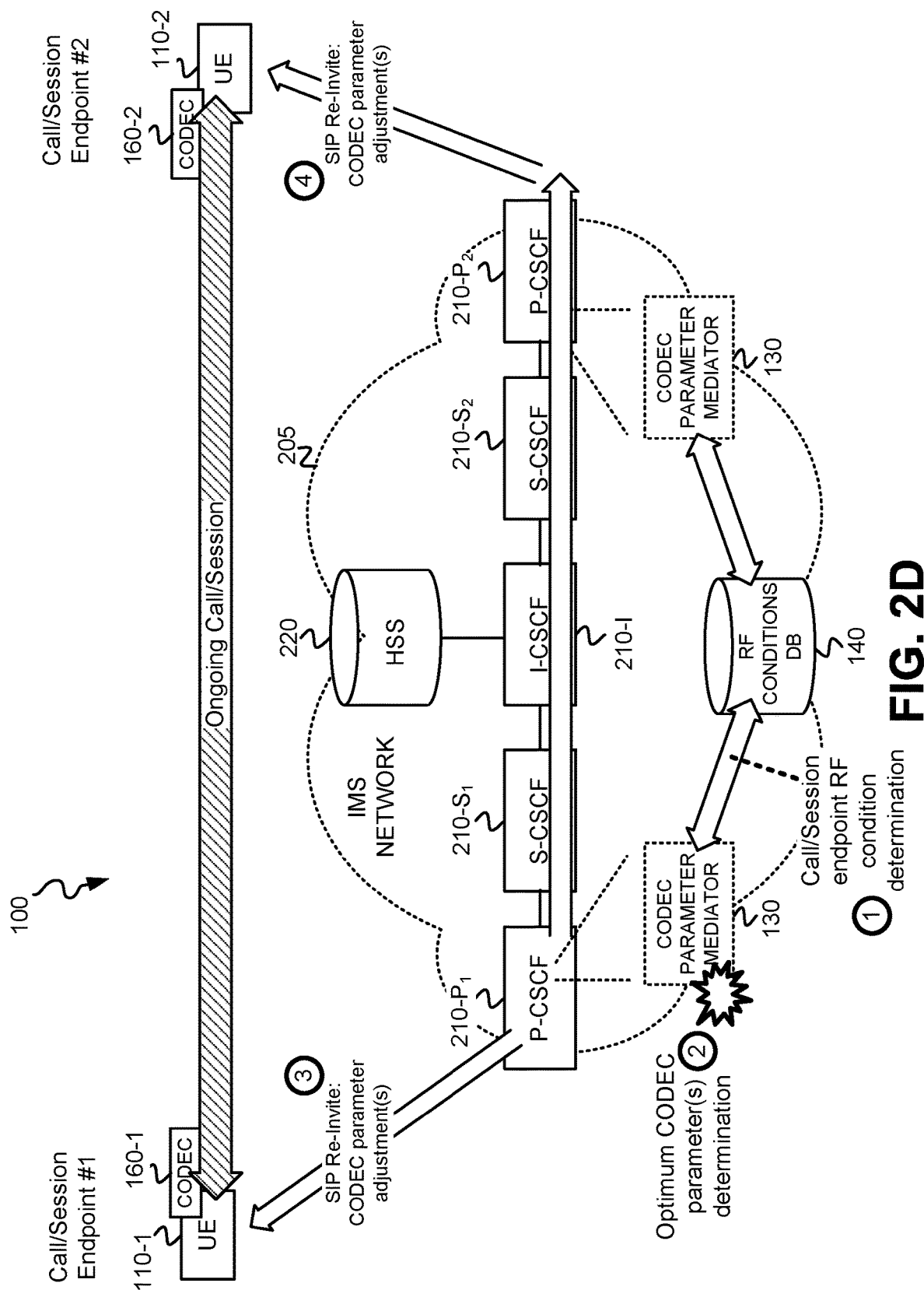
FIG. 2D depicts an overview of call/session endpoint codec parameter adjustment during an ongoing call or session.

FIG. 2D depicts an overview of call/session endpoint codec parameter adjustment in an exemplary implementation in which VoLTE network 200 is used for establishing the call/session and IMS network 205 is used for signaling associated with the call/session in circumstances where the call/session has already been set-up between UE 110-1 and UE 110-2 and the call/session is ongoing. During the ongoing call/session between UE 110-1 and UE 110-2, the functionality of P-CSCF 210-$P_1$ that implements codec parameter mediator 130 may, either periodically or upon the occurrence of an event (e.g., known change in RF conditions at the cell serving UE 110-1 or the cell serving UE 110-2), perform a lookup into RF conditions DB 140 to retrieve RF conditions data that permits a determination of current call/session endpoint RF conditions (shown with a "1" within a circle). For example, P-CSCF 210-$P_1$ may have extracted cell identifiers from the call/session set-up messaging, or from other signaling, to identify each of the cells serving UEs 110-1 and 110-2. P-CSCF 210-$P_1$ may use the extracted cell identifiers for performing the lookup into RF conditions DB 140 to determine what RF conditions are currently present at the cells serving UEs 110-1 and 110-2.

Based on the determined RF conditions at each of the cells serving UEs 110-1 and 110-2, P-CSCF 210-$P_1$ determines optimum codec parameters (shown as a "2" within a circle) for the call/session between UEs 110-1 and 110-2. The optimum codec parameter determination may include determining optimum codec parameters for the codec 160-1 at call/session endpoint #1 and/or determining optimum codec parameters for the codec 160-2 at call/session endpoint #2. In an implementation in which P-CSCF 210-$P_1$ simultaneously optimizes the codec parameters for both codecs 160 at both call/session endpoints, P-CSCF 210-$P_1$ may balance the codec parameters between codec 160-1 at call/session endpoint #1 and codec 160-2 at call/session endpoint #2 to optimize certain aspects of call/session quality or quality of service (Qos) between UEs 110-1 and 110-2.

As shown in FIG. 2D, based on the optimum codec parameter determination, P-CSCF 210-$P_1$ sends, via a first SIP Re-Invite message (shown with a "3" within a circle) the determined first codec parameter adjustment(s) to codec 160-1 at UE 110-1, and/or sends, via a second SIP Re-Invite message (shown with a "4" within a circle) the second determined codec parameter adjustment(s) to codec 160-2 at UE 110-2 via S-CSCF 210-$S_1$, I-CSCF 210-I, S-CSCF 210-$S_2$, and P-CSCF 210-$P_2$. Codec 160-1 at UE 110-1, and codec 160-2 at UE 110-2, adjust the codec operation associated with encoding/decoding data of the call/session based on the received codec parameter adjustments. In an implementation in which codec 160 employs the EVS codec standard, codec parameter mediator 130 may adjust the value of "ch-aw-recv" to a new channel-aware mode for receive direction redundancy, or may change the value of a "br" parameter to a new codec bit rate, where both the channel-aware mode and the changed "br" parameter improve the RF link reliability.

Figure 3:
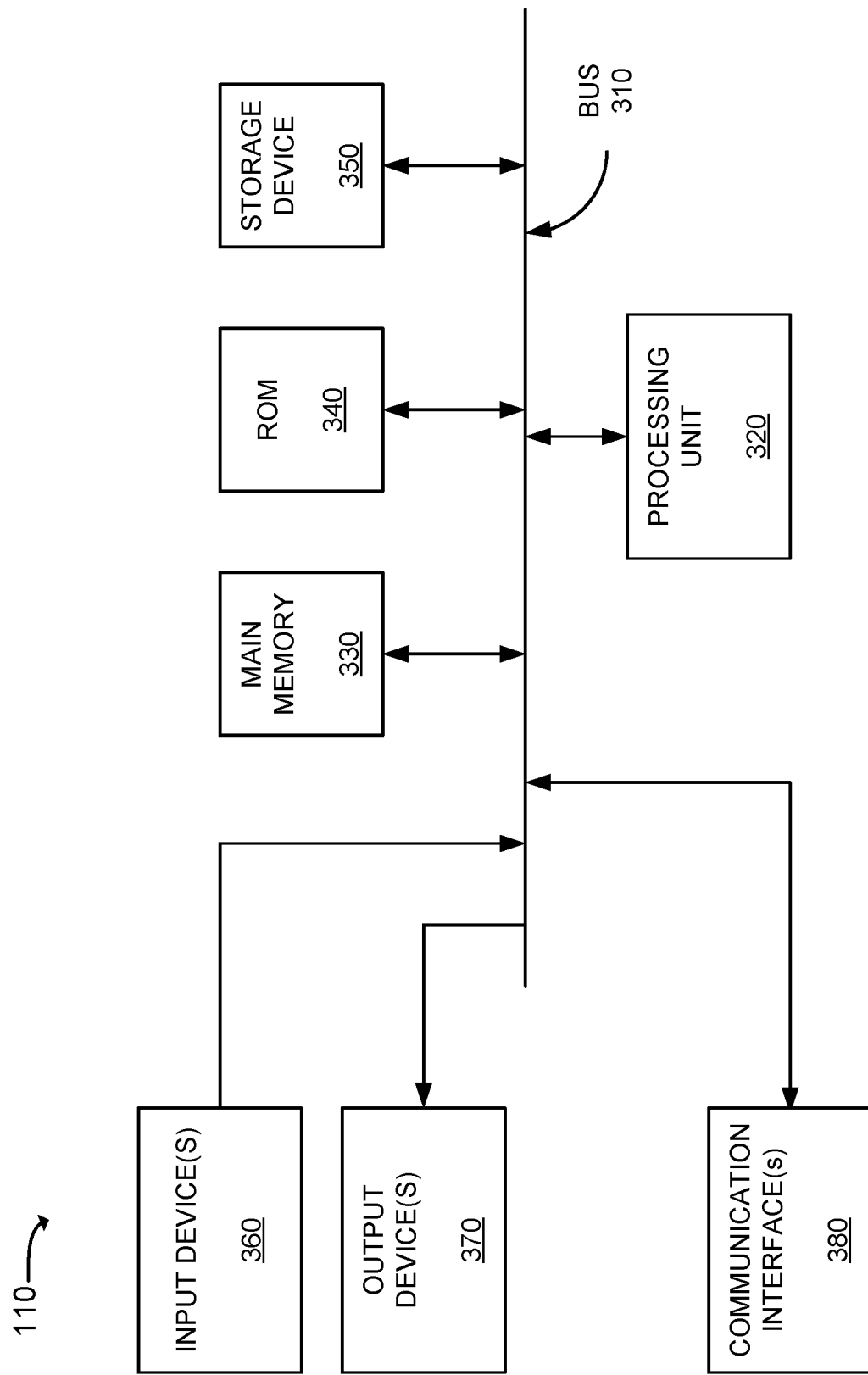
FIG. 3 is a diagram that depicts exemplary components of the user equipment of FIG. 1A.

FIG. 3 is a diagram that depicts exemplary components of UE 110. CSCF 210, RF conditions DB 140, codec parameter mediator 130, HSS 220, and base station 120 may be similarly configured, but possibly with some variations in components or configuration. UE 110 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of UE 110.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

Input device 360 may include one or more mechanisms that permit an operator to input information into UE 110, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables UE 110 to communicate with other devices and/or systems. For example, communication interface(s) 380 may include a wireless transceiver(s), and associated antenna(s), for communicating via network(s) 150.

The configuration of components of UE 110 illustrated in FIG. 3 is for illustrative purposes. Other configurations may be implemented. Therefore, UE 110 may include additional, fewer and/or different components than those depicted in FIG. 3.

Figure 4:
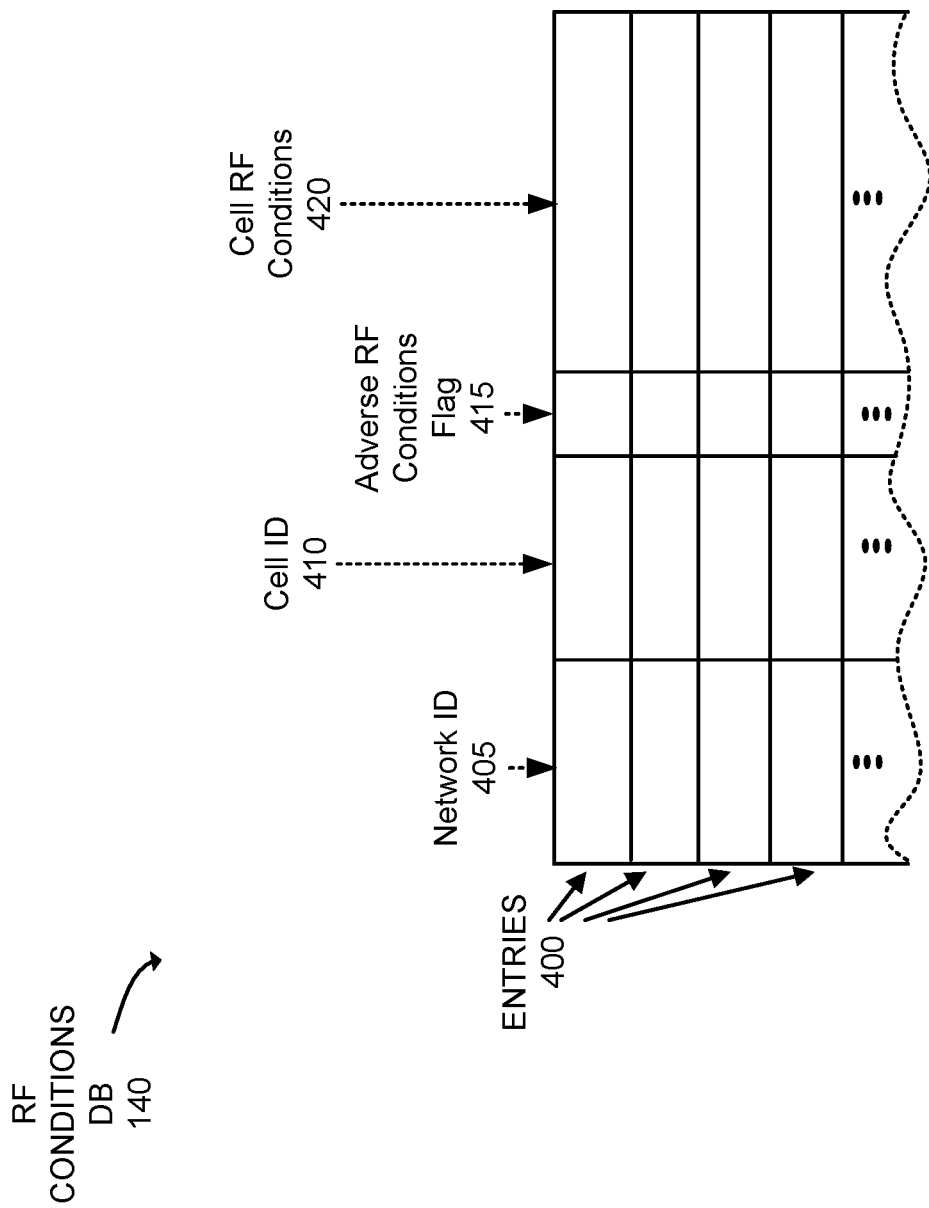
FIG. 4 is a diagram that depicts an exemplary implementation of the Radio Frequency conditions database of FIG. 1A.

FIG. 4 is a diagram that depicts an exemplary implementation of RF conditions DB 140. As shown, a data structure of DB 140 may include multiple entries 400, with each entry 400 including a network identifier (ID) field 405, a cell ID field 410, an adverse RF conditions flag field 415, and a cell RF conditions field 420.

Network ID field 405 stores data that identifies a particular wireless network, the RF conditions of which are detailed in fields 415 and 420 of the corresponding entry 400. Cell ID field 410 stores data that identifies a cell of a network, the RF conditions of which are detailed in fields 415 and 420 of the corresponding entry 400.

Adverse RF conditions flag field 415 stores a flag that identifies the existence of adverse RF conditions being present at the cell identified in field 410. Therefore, a check of field 415 for a given cell may identify adverse RF conditions for which there may be a need to adjust codec parameters. Cell RF conditions field 420 stores various data that identify RF conditions with the cell identified in field 410 of the corresponding entry 400. The identified RF conditions may include any type of RF conditions within the cell that adversely impact signal quality and/or QoS. The identified RF conditions may include, for example, high BER conditions, low SNR conditions, low signal strength conditions, and/or conditions causing a high number of dropped calls/session.

To locate a particular entry 400, DB 140 may be queried with, for example, a cell ID to locate an entry 400 having a matching cell ID stored in field 410. When such an entry 400 is located, data may be stored in one or more fields 405, 410, 415, and/or 420 of the entry 400, or data may be retrieved from one or more of fields 405, 410, 415, and/or 420 of the entry 400. Other fields of an entry 400, instead of cell ID field 410, may be used for querying DB 140.

RF conditions DB 140 is depicted in FIG. 4 as including a tabular data structure with certain numbers of fields having certain content. The tabular data structure of DB 140 shown in FIG. 4, however, is for illustrative purposes. Other types of data structures may alternatively be used. The number, types, and content of the entries and/or fields in the data structure of DB 140 illustrated in FIG. 4 are also for illustrative purposes. Other data structures having different numbers of, types of and/or content of, the entries and/or the fields may be implemented. Therefore, RF conditions DB 140 may include additional, fewer and/or different entries and/or fields than those depicted in FIG. 4.

Figure 5:
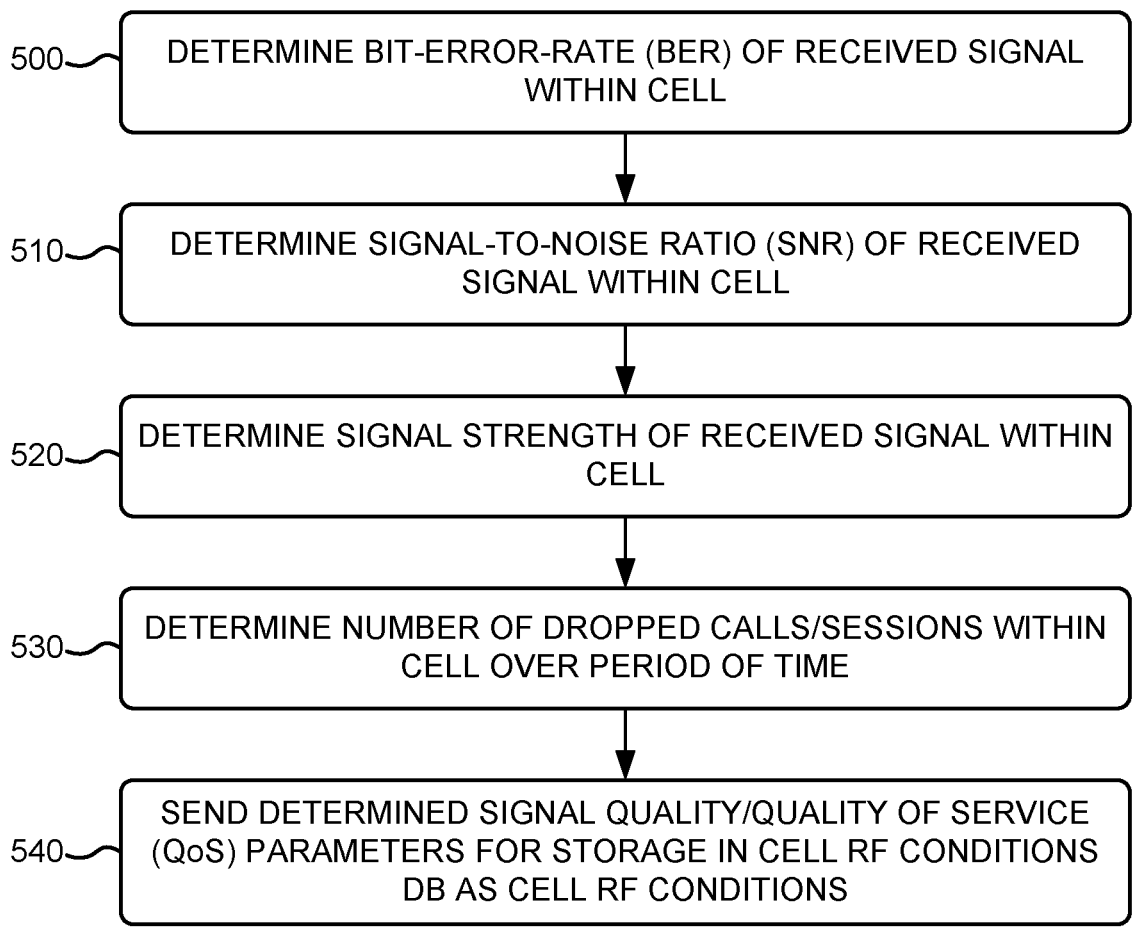
FIG. 5 is a flow diagram of an exemplary process for determining signal quality and/or quality of service parameters associated with the radio frequency conditions at a particular location within a wireless network.
Figure 6A:
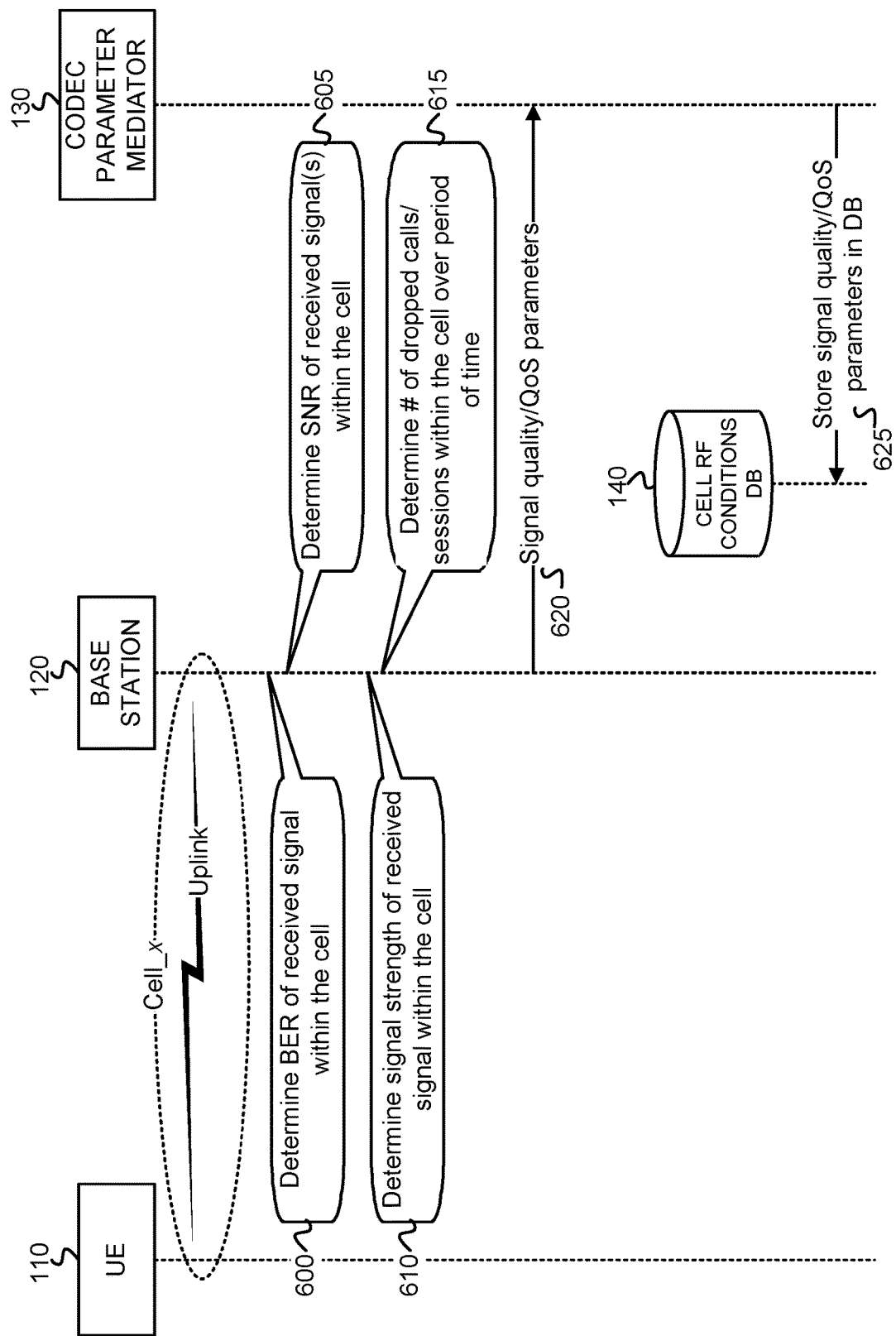
FIGS. 6A and 6B depict exemplary messaging and operations associated with the exemplary process of FIG. 5.
Figure 6B:
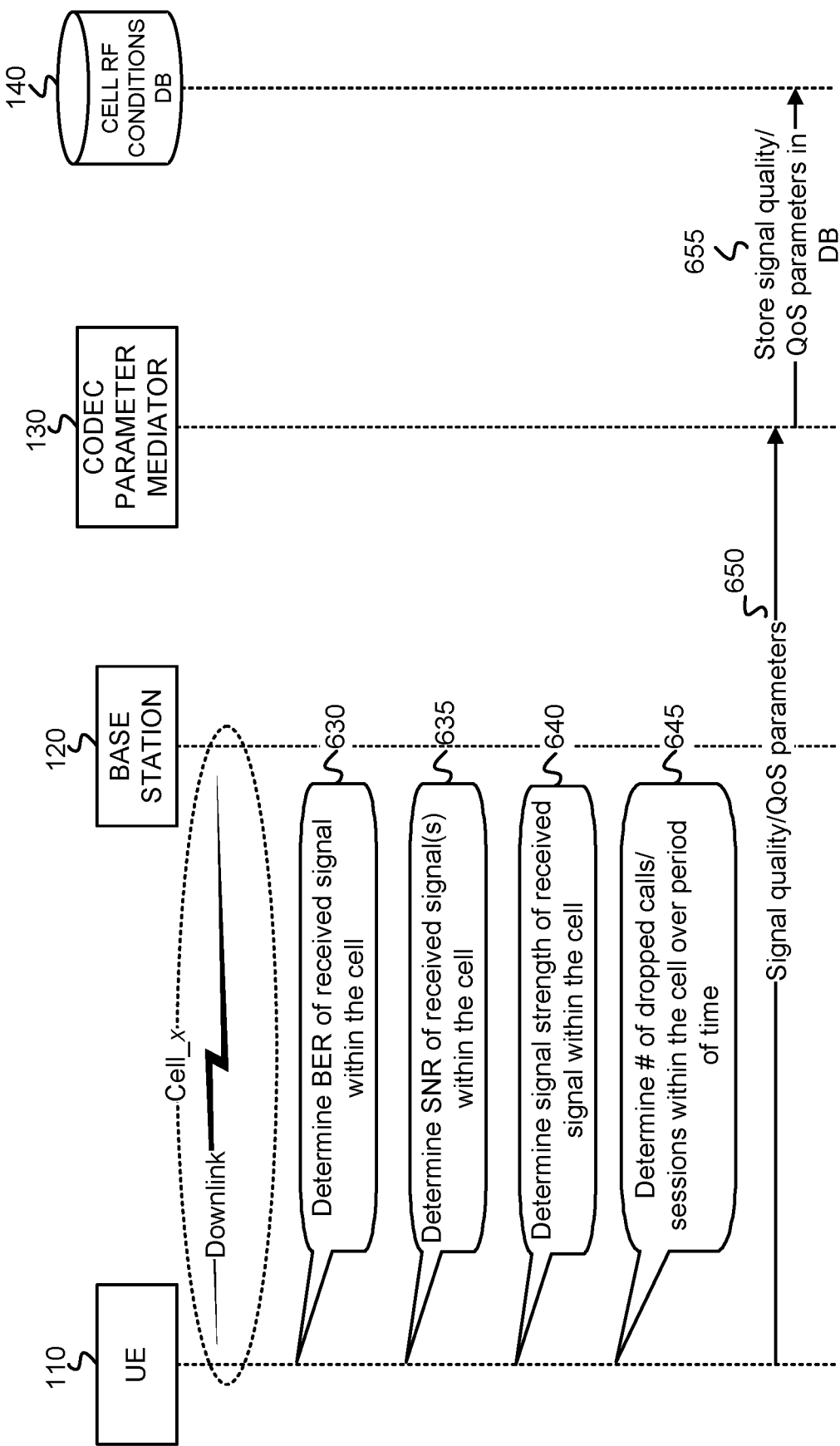

FIG. 5 is a flow diagram of an exemplary process for determining signal quality and/or quality of service (Qos) parameters associated with the RF conditions at a particular location (e.g., a cell) within a wireless network. The exemplary process of FIG. 5 is described below with reference to the messaging/operations diagrams of FIGS. 6A and 6B. The exemplary process of FIG. 5 may be repeated periodically (e.g., at timed intervals), or upon the occurrence of a specified event(s). FIG. 6A depicts exemplary messaging and operations associated with measuring signal quality and/or QoS parameters on the uplink from UE 110, at base station 120, associated with RF conditions within a cell_x. FIG. 6B depicts exemplary messaging and operations associated with measuring signal quality and/or QoS parameters on the downlink from base station 120, at UE 110, associated with RF conditions within the cell_x.

The exemplary process includes UE 110 or base station 120 determining a bit-error-rate (BER) of a received RF signal within a cell (block 500). UE 110 or base station 120 may determine the BER of the received RF signal using existing BER measurement and calculation techniques. As shown in FIG. 6A, base station 120 may determine 600 the BER of the received uplink signal within cell_x from UE 110. As further shown in FIG. 6B, UE 110 may determine 630 the BER of the received downlink signal within cell_x from base station 120.

UE 110 or base station 120 determines a signal-to-noise ratio (SNR) of the received RF signal within the cell (block 510). UE 110 or base station 120 may determine the SNR of the RF signal using existing SNR measurement and calculation techniques. As shown in FIG. 6A, base station 120 may determine 605 the SNR of the received uplink signal within cell_x from UE 110. As further shown in FIG. 6B, UE 110 may determine 635 the SNR of the received downlink signal within cell_x from base station 120.

UE 110 or base station 120 determines a signal strength of the received RF signal within the cell (block 520). UE 110 or base station 120 may determine the signal strength using existing signal strength measurement techniques. As shown in FIG. 6A, base station 120 may determine 610 the signal strength of the received uplink signal within cell_x from UE 110. As further shown in FIG. 6B, UE 110 may determine 640 the signal strength of the received downlink signal within cell_x from base station 120.

UE 110 or base station 120 determines a number of dropped calls/sessions within the cell over a period of time (block 530). A "dropped call/session" includes any call or session that is terminated or disconnected for any reason other than a user at UE 110 choosing to end the call or session. For example, if a call or session is disconnected due to insufficient signal strength on the uplink or downlink, then the call/session is considered to be a "dropped call/session." UE 110 or base station may determine the number of dropped calls/sessions using existing dropped call measurement techniques. As shown in FIG. 6A, base station 120 may determine 615 the number (#) of dropped calls/sessions within cell_x involving UE 110. As further shown in FIG. 6B, UE 110 may determine 645 the # of dropped call/sessions within cell_x involving base station 120.

UE 110 or base station 120 sends the signal quality/quality of service (QoS) parameters for the cell, determined in blocks 500, 510, 520, and 530, for storage in cell RF conditions DB 140 as current cell RF conditions (block 540). In one implementation, UE 110 or base station 120 may send the signal quality/QoS parameters for the cell to codec parameter mediator 130 which, in turn, stores the parameters in DB 140 (e.g., in field 420). In another implementation, UE 110 or base station 120 send the signal quality/QoS parameters directly for storage in DB 140. As shown in FIG. 6A, base station 120 may send a message 620, to codec parameter mediator 130, that includes the determined signal quality/QoS parameters and, upon receipt, codec parameter mediator 130 stores 625 the signal quality/QoS parameters in an appropriate entry 400 of DB 140 for cell_x. As shown in FIG. 6B, UE 110 may send a message 650, to codec parameter mediator 130, that includes the determined signal quality/QoS parameters and, upon receipt, codec parameter mediator 130 stores 655 the signal quality/QoS parameters in an appropriate entry 400 of DB 140 for cell_x.

Figure 7A:
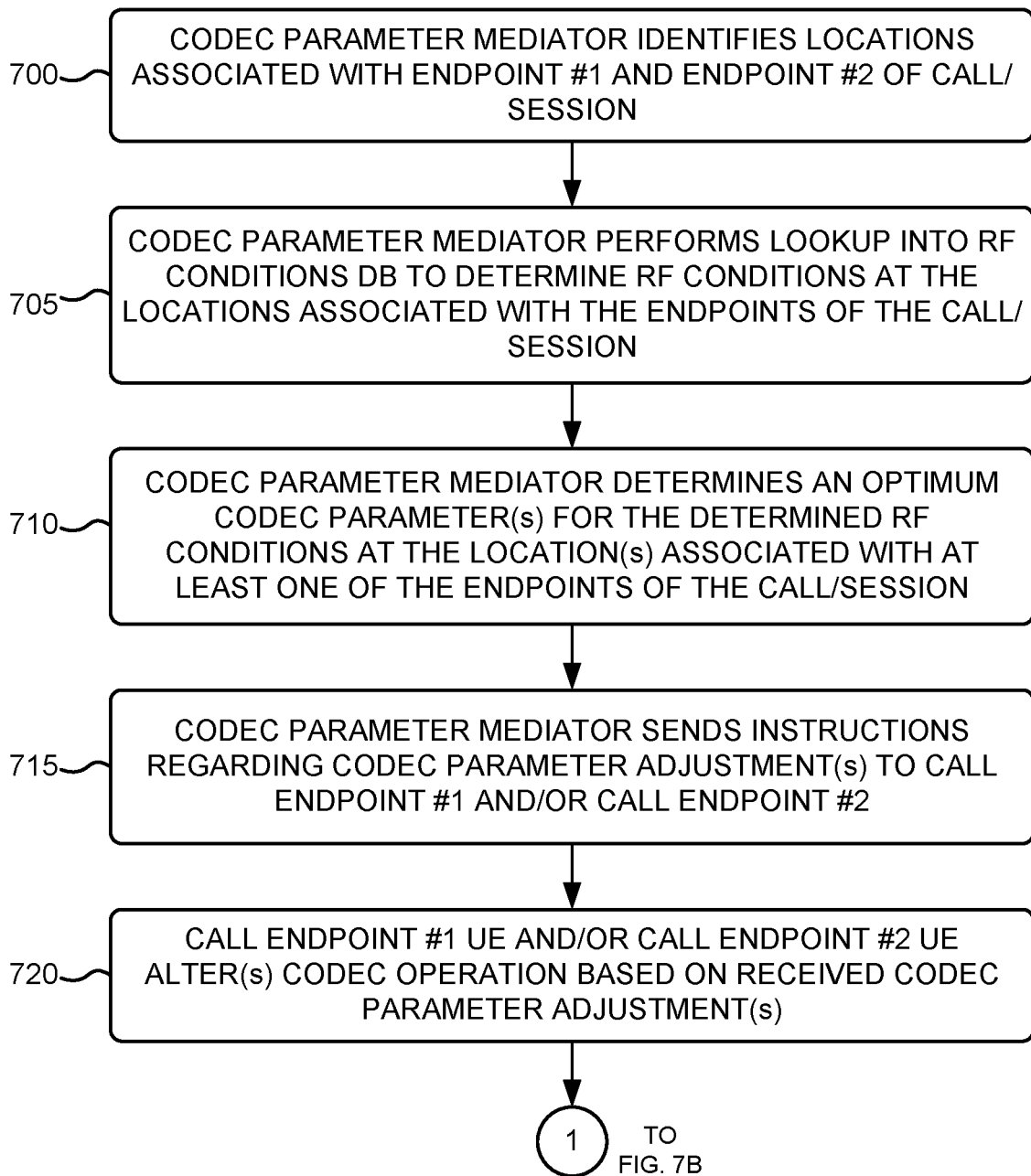
FIGS. 7A and 7B are flow diagrams of an exemplary process for adjusting codec parameters at one or more call/session endpoints based on determined radio frequency conditions at the endpoints.
Figure 7B:
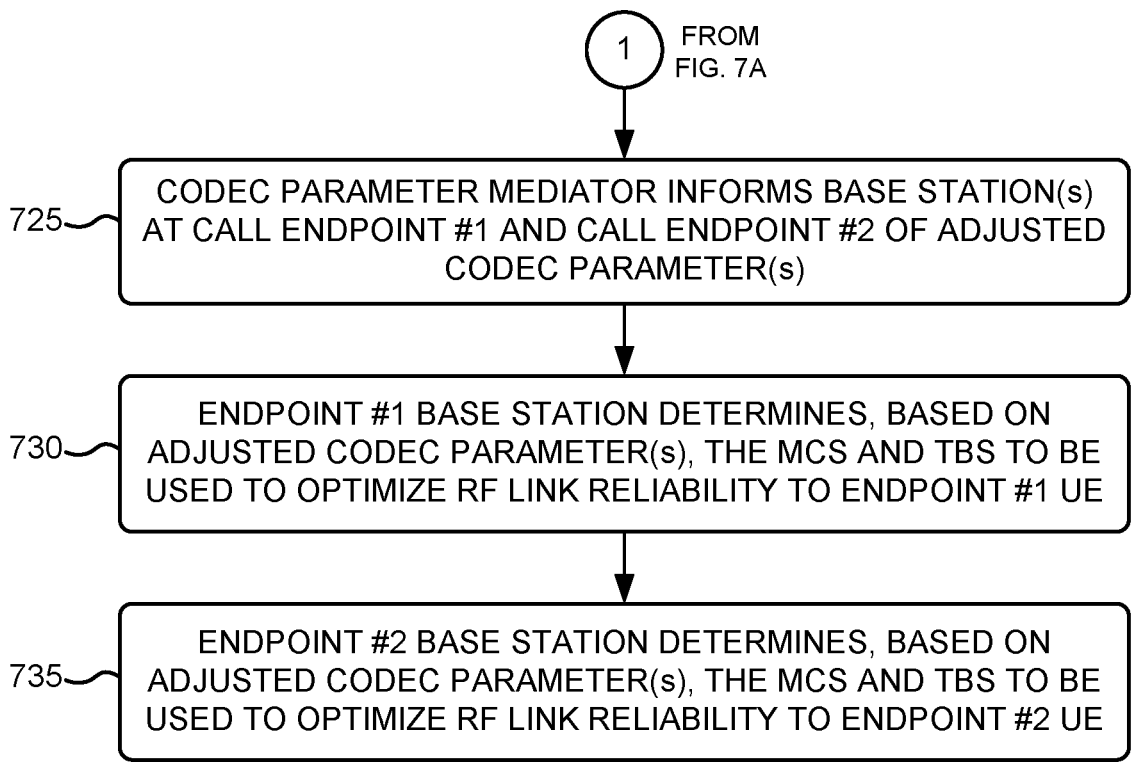

FIGS. 7A and 7B are flow diagrams of an exemplary process for adjusting codec parameters at one or more call/session endpoints based on determined RF conditions at the endpoints. The exemplary process of FIGS. 7A and 7B is described below with reference to the messaging/operations diagrams of FIGS. 8A and 8B. The exemplary process of FIGS. 7A and 7B may be executed upon the set-up/initiation of any call or session, may be executed at periodic intervals during an ongoing call or session, or may be executed during an ongoing call or session due to the occurrence of one or more specified triggering events. For example, if RF conditions change at one or both call/session endpoints associated with an ongoing call/session, then the exemplary process of FIGS. 7A and 7B may be executed to adjust codec parameters based on the changed endpoint RF conditions.

Figure 8A:
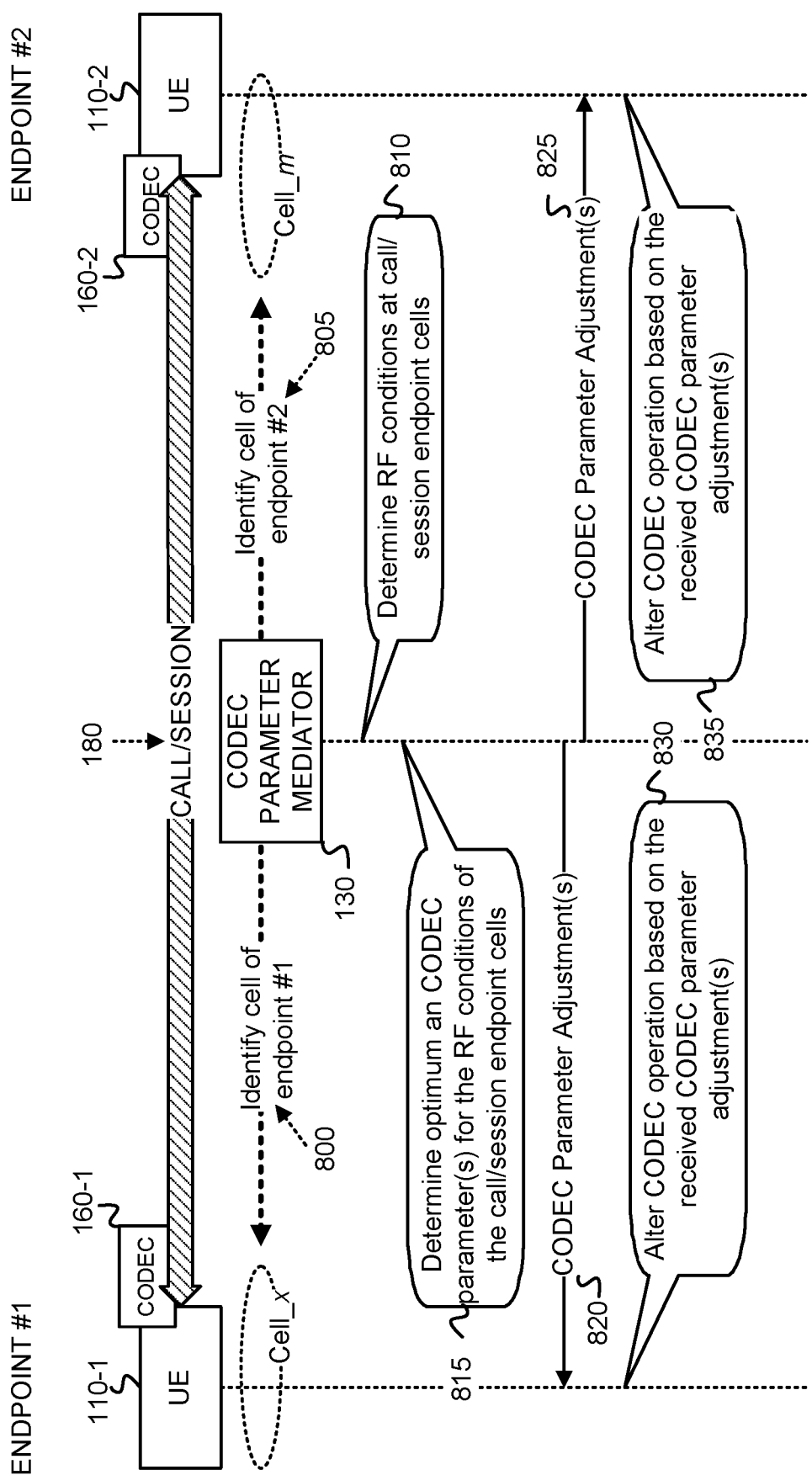
FIGS. 8A and 8B depict exemplary messaging and operations associated with the exemplary process of FIGS. 7A and 7B.

The exemplary process includes codec parameter mediator 130 identifying locations associated with endpoint #1 and endpoint #2 of the call/session (block 700). In an implementation in which the wireless network via which the UEs 110 are communicating is a PLMN, and the UEs 110 are served by respective cells of the PLMN, then the locations associated with the endpoints of the call/session include the respective cells of the PLMN that are serving each of the UEs 110-1 and 110-2. For example, referring to FIG. 1B, the location of call/session endpoint #1 is cell_x, and the location of call/session endpoint #2 is cell_m. As shown in FIG. 8A, the call/session 180 may be established between UE 110-1 at endpoint #1 and UE 110-2 at endpoint #2. FIG. 8A further depicts codec parameter mediator 130 identifying 800 the cell ID (cell_x) associated with the location of call/session endpoint #1, and identifying 805 the cell ID (cell_m) associated with the location of call/session endpoint #2.

Codec parameter mediator 130 performs a lookup into RF conditions DB 140 to determine RF conditions at the determined locations associated with the endpoints of the call/session (block 705). Codec parameter mediator 130 may query RF conditions DB 140 to locate entries 400 having cell IDs stored in fields 410 that match the cell IDs determined in block 700. Once an entry 400 for each matching cell ID is located, codec parameter mediator 130 retrieves cell RF conditions data from field 420 of each entry 400, and may analyze the retrieved data to determine RF conditions at the endpoint locations. Codec parameter mediator 130 may additionally check whether the flag in field 415 is set within each located entry 400. If the flag in field 415 is not set, then codec parameter mediator 130 may determine that sufficiently adverse conditions do not exist at the particular endpoint location and, therefore, no codec parameter adjustments may be needed based on the RF conditions at the particular endpoint location (though RF conditions at the other endpoint of the call/session may necessitate codec parameter adjustments). In some implementations, in addition to using the cell ID of each serving cell, codec parameter mediator 130 may use the network ID associated with the wireless network in which each serving cell is located. Therefore, referring to FIG. 8A, cell_x, serving UE 110-1 at call/session endpoint #1, may be located in a first wireless network having a first network ID, and call_m, serving UE 110-2 at call/session endpoint #2, may be located in a second wireless network having a different, second network ID. In other circumstances, the serving cells at each endpoint of a call/session may be located in a same wireless network. FIG. 8A depicts codec parameter mediator 130 determining 810 RF conditions at the call/session endpoint cells.

Codec parameter mediator 130 determines an optimum codec parameter(s) for the determined RF conditions at the location(s) associated with at least one of the endpoints of the call/session (block 710). Codec parameter mediator 130, based on the RF conditions determined in block 705 for each call/session endpoint location (e.g., each serving cell at the call/session endpoints), determines one or more codec parameters for optimizing call/session RF link reliability. The codec parameter(s) being optimized may include, for example, a codec bit rate that is used at each codec 160 at the UEs 110 at the call/session endpoints. The codec bit rate may be lowered to a particular bit rate, or to within a particular range of bit rates, that improves the codec resiliency to bit errors. The codec parameter(s) being optimized may further include, for example, the selection of a particular mode, among multiple modes, associated with the operation of a codec 160. As a specific example, if the AMR-WB codec standard is implemented at codecs 160, then the codec parameter(s) may include selection or setting of a particular mode associated with the AMR-WB codec. FIG. 8A depicts codec parameter mediator 130 determining 815 an optimum codec parameter(s) for the RF conditions of the call/session endpoint cells.

Codec parameter mediator 130 sends instructions regarding codec parameter adjustment(s) to call endpoint #1 and/or call endpoint #2 (block 715). Based on the codec parameter(s) that is/are optimized in block 710, codec parameter mediator 130 determines what adjustments need to be performed at the codecs 160 of the UEs 110 at the call endpoints of the call/session. Codec parameter mediator 130 generates a message that includes instructions to adjust the codec parameter(s) to the optimized codec parameter(s) determined in block 710. FIG. 8A depicts codec parameter mediator 130 sending a message 820, to UE 110-1 at call/session endpoint #1, that includes one or more first codec parameter adjustments for adjusting codec 160-1 at UE 110-1. FIG. 8A further depicts codec parameter mediator 130 sending a message 825, that includes one or more second codec parameter adjustments for adjusting codec 160-2 at UE 110-2.

Call endpoint #1 UE 110-1 and/or call endpoint #2 UE 110-2 alter(s) codec operation based on the received codec parameter adjustment(s) (block 720). If, for example, the codec parameter(s) being optimized includes the codec bit rate, codec 160-1 at UE 110-1 and/or codec 160-2 at UE 110-2 changes to the new codec bit rate, or to a new codec bit rate within a selected range of codec bit rates. FIG. 8A depicts UE 110-1 altering 830 the operation of codec 160-1 based on the received one or more first codec parameter adjustments. FIG. 8A further depicts UE 110-2 altering 835 the operation of codec 160-2 based on the received one or more second codec parameter adjustments.

Figure 8B:
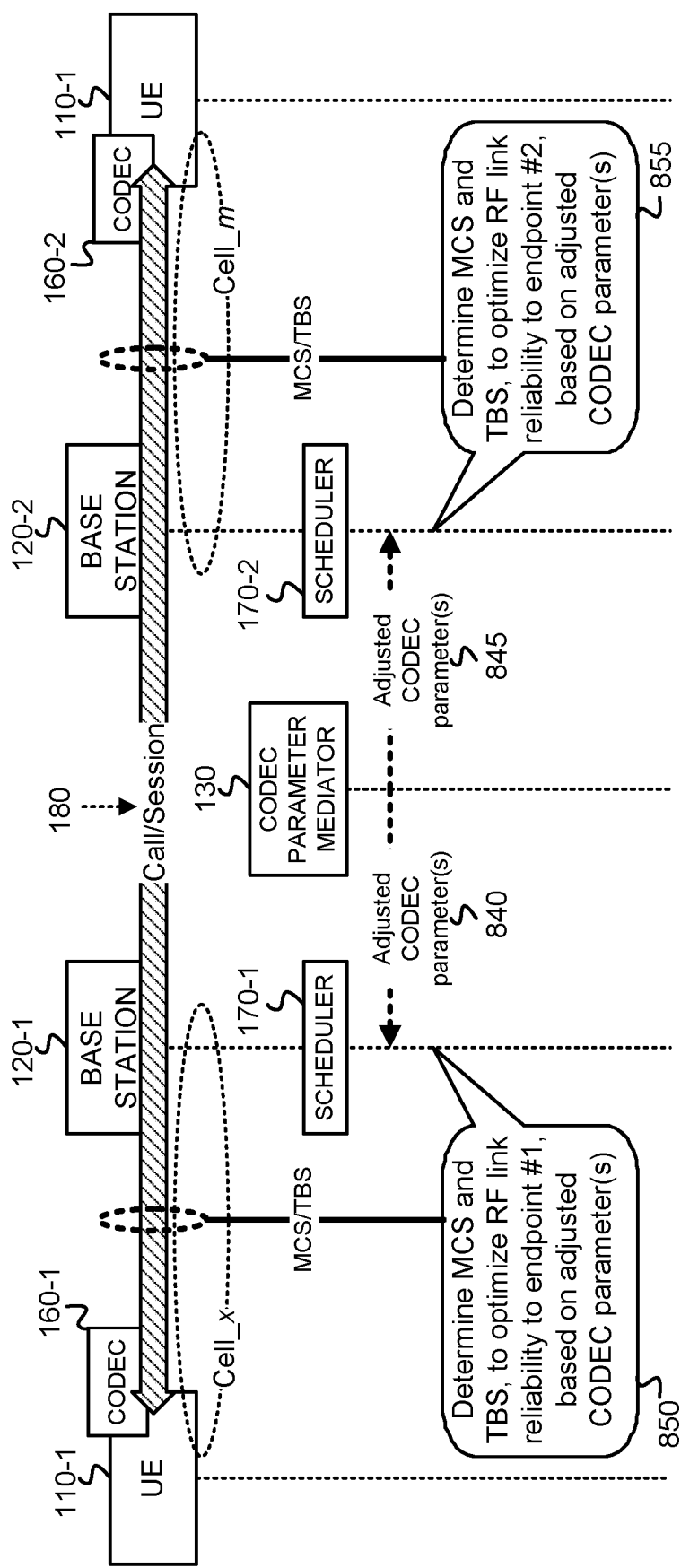

Codec parameter mediator 130 informs base station(s) 120 at call endpoint #1 and call endpoint #2 of the adjusted codec parameter(s) (block 725). FIG. 8B depicts codec parameter mediator 130 sending a message 840, to scheduler 170-1 of base station 120-1, that includes the adjusted codec parameter(s). FIG. 8B further depicts codec parameter mediator 130 sending a message 845, to scheduler 170-2 of base station 120-2, that includes the adjusted codec parameter(s). Endpoint #1 base station 120 determines, based on the adjustment codec parameter(s), the modulation coding scheme (MCS) and transport block size (TBS) to be used to optimize RF link reliability to endpoint #1 UE 110-1 (block 730). The scheduler 170-1 of endpoint #1 base station 120 subsequently uses the determined MCS and TBS for receiving call/session data on the RF uplink from UE 110-1, and transmitting call/session data on the RF downlink to UE 110-1. FIG. 8B depicts scheduler 170-1 determining 850 the MCS and TBS, to optimize the RF link reliability to endpoint #1, based on the received adjusted codec parameter(s) 840. Endpoint #2 base station 120 determines, based on the adjustment codec parameter(s), the MCS and TBS to be used to optimize RF link reliability to endpoint #2 UE 110-2 (block 735). The scheduler 170-2 of endpoint #2 base station 120 subsequently uses the determined MCS and TBS for receiving call/session data on the RF uplink from UE 110-2, and transmitting call/session data on the RF downlink to UE 110-2. FIG. 8B depicts scheduler 170-2 determining 855 the MCS and TBS, to optimize the RF link reliability to endpoint #2, based on the received adjusted codec parameter(s) 845.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7A, and 7B, and operation/message flows with respect to FIGS. 1B, 2C, 2D, 6A, 6B, 8A, and 8B, the order of the blocks and/or operation/message flows may be varied in other implementations. Moreover, non-dependent blocks may be performed in parallel. Exemplary embodiments herein have been described as using SIP messages (e.g., SIP Invite, SIP Re-invite). However, protocols other than SIP may be used in the techniques described herein. Such protocols may employ messaging that is different than the SIP messages described herein.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a network device, a first location identifier associated with a first endpoint of a call or session and a second location identifier associated with a second endpoint of the call or session;
   performing, at the network device and using the first location identifier and the second location identifier, a lookup in a radio frequency (RF) conditions database to determine first RF conditions at the first endpoint and second RF conditions at the second endpoint,
      wherein the first RF conditions and the second RF conditions differ,
      wherein the RF conditions database stores a plurality of entries corresponding to a plurality of locations,
      wherein each entry includes a location identifier associated with a location, RF conditions at the location, and an indication of whether adverse conditions exist at the location,
      wherein the adverse conditions include at least one of a high bit-error-rate (BER), a low signal-to-noise ratio (SNR), a low signal strength, or a high number of dropped calls or sessions, and
      wherein the RF conditions database is updated at periodic intervals to reflect current RF conditions at the plurality of locations;
   determining optimum first codec parameters for optimizing a first RF link reliability for the determined first RF conditions at the first endpoint of the call or session;
   determining optimum second codec parameters for optimizing a second RF link reliability for the determined second RF conditions at the second endpoint of the call or session,
   wherein determining the optimum first and second codec parameters comprises:
      balancing the first codec parameters and the second codec parameters to optimize codec bit error performance at both a first codec at a first device at the first endpoint and a second codec at a second device at the second endpoint; and
   providing, by the network device, the first codec parameters to the first endpoint for altering operation of the first codec at the first device at the first endpoint.

2. The method of claim 1, wherein determining the optimum first codec parameters further comprises:

determining an optimum first codec bit rate, to improve codec bit errors at the first codec, based on the determined first RF conditions.

3. The method of claim 1, wherein determining the optimum second codec parameters further comprises:
determining an optimum second codec bit rate to improve codec bit errors at the second codec at the second device at the second endpoint, based on the determined second RF conditions.

4. The method of claim 3, wherein the network device includes the first device or the second device.

5. The method of claim 1, further comprising:
providing, by the network device, the second codec parameters to the second endpoint for altering operation of a second codec at the second device at the second endpoint.

6. The method of claim 1, further comprising:
sending, by the network device, the first codec parameters to a first base station serving the first device at the first endpoint,
wherein the first base station uses the first codec parameters to adjust a first modulation coding scheme (MCS) and a first transport block size (TBS) for optimal RF link reliability at the first device.

7. The method of claim 6, further comprising:
sending, by the network device, the second codec parameters to a second base station serving the second device at the second endpoint,
wherein the second base station uses the second codec parameters to adjust a second MCS and a second TBS for optimal RF link reliability at the second device.

8. The method of claim 1, wherein the first location identifier includes a first cell identifier and the second location identifier includes a second cell identifier.

9. A network device, comprising:
a communication interface connected to a network; and
a processing unit configured to:
determine a first location identifier associated with a first endpoint of a call or session and a second location identifier associated with a second endpoint of the call or session,
perform a lookup in a radio frequency (RF) conditions database to determine first RF conditions at the first endpoint and second RF conditions at the second endpoint, wherein the first RF conditions and the second RF conditions differ,
wherein the RF conditions database stores a plurality of entries corresponding to a plurality of locations,
wherein each entry includes a location identifier associated with a location, RF conditions at the location, and an indication of whether adverse conditions exist at the location,
wherein the adverse conditions include at least one of a high bit-error-rate (BER), a low signal-to-noise ratio (SNR), a low signal strength, or a high number of dropped calls or sessions, and
wherein the RF conditions database is updated at periodic intervals to reflect current RF conditions at the plurality of locations,
determine optimum first codec parameters for optimizing a first RF link reliability for the determined first RF conditions at the first endpoint of the call or session,
determine optimum second codec parameters for optimizing a second RF link reliability for the determined second RF conditions at the second endpoint of the call or session,
wherein, when determining the optimum first and second codec parameters, the processing unit is further configured to:
balance the first codec parameters and the second codec parameters to optimize codec bit error performance at both a first codec at a first device at the first endpoint and a second codec at a second device at the second endpoint, and
provide the first codec parameters to the first endpoint for altering operation of the first codec at the first device at the first endpoint.

10. The network device of claim 9, wherein, when determining the optimum first codec parameters, the processing unit is configured to:
determine an optimum first codec bit rate, to improve codec bit errors at the first codec, based on the determined first RF conditions; and
wherein, when determining the optimum second codec parameters, the processing unit is configured to:
determine an optimum second codec bit rate to improve codec bit errors at the second codec at the second endpoint, based on the determined second RF conditions.

11. The network device of claim 9, wherein the processing unit is further configured to:
provide the second codec parameters to the second endpoint for altering operation of the second codec at the second device at the second endpoint.

12. The network device of claim 9, wherein the processing unit is further configured to:
send, via the communication interface, the first codec parameters to a first base station serving the first device at the first endpoint,
wherein the first base station uses the first codec parameters to adjust a first modulation coding scheme (MCS) and a first transport block size (TBS) for optimal RF link reliability at the first device.

13. The network device of claim 12, wherein the processing unit is further configured to:
send, via the communication interface, the second codec parameters to a second base station serving the second device at the second endpoint,
wherein the second base station uses the second codec parameters to adjust a second MCS and a second TBS for optimal RF link reliability at the second device.

14. The network device of claim 9, wherein the first location identifier includes a first cell identifier and the second location identifier includes a second cell identifier.

15. A non-transitory storage medium storing instructions executable by a network device, wherein the instructions comprise instructions to cause the network device to:
determine a first location identifier associated with a first endpoint of a call or session and a second location identifier associated with a second endpoint of the call or session,
perform a lookup in a radio frequency (RF) conditions database to determine first RF conditions at the first endpoint and second RF conditions at the second endpoint, wherein the first RF conditions and the second RF conditions differ,
wherein the RF conditions database stores a plurality of entries corresponding to a plurality of locations,
wherein each entry includes a location identifier associated with a location, RF conditions at the location, and an indication of whether adverse conditions exist at the location, wherein the adverse conditions include at least one of a high bit-error-rate (BER), a low signal-to-noise ratio (SNR), a low signal strength, or a high number of dropped calls or sessions, and wherein the RF conditions database is updated at periodic intervals to reflect current RF conditions at the plurality of locations;

determine optimum first codec parameters for optimizing a first RF link reliability for the determined first RF conditions at the first endpoint of the call or session;

determine optimum second codec parameters for optimizing a second RF link reliability for the determined second RF conditions at the second endpoint of the call or session, wherein the instructions to determine the optimum first and second codec parameters comprise instructions to:

balance the first codec parameters and the second codec parameters to optimize codec bit error performance at both a first codec of a first device at the first endpoint and a second codec at a second device at the second endpoint; and provide the first codec parameters to the first endpoint for altering operation of the first codec at the first device at the first endpoint.

16. The non-transitory storage medium of claim 15, wherein the instructions to determine the optimum first and second codec parameters comprise instructions to:

determine an optimum codec bit rate, to improve codec bit errors at the first codec and the second codec, based on the determined first RF conditions and the determined second RF conditions.

17. The non-transitory storage medium of claim 15, wherein the instructions further comprise instructions to:

provide the second codec parameters to the second endpoint for altering operation of the second codec at the second device at the second endpoint.

18. The non-transitory storage medium of claim 15, wherein the instructions further comprise instructions to:

send the first codec parameters to a first base station serving the first device at the first endpoint, wherein the first base station uses the first codec parameters to adjust a first modulation coding scheme (MCS) and a first transport block size (TBS) for optimal RF link reliability at the first device.

19. The non-transitory storage medium of claim 18, wherein the instructions further comprise instructions to:

send the second codec parameters to a second base station serving the second device at the second endpoint, wherein the second base station uses the second codec parameters to adjust a second MCS and a second TBS for optimal RF link reliability at the second device.

20. The non-transitory storage medium of claim 15, wherein the first location identifier includes a first cell identifier and the second location identifier includes a second cell identifier.

* * * * *